J. C. COUNTS.
Fruit-Gatherer.

No. 64,749.

Patented May 14, 1867.

Witnesses:
F. Clausen.
L. Murphy

Inventor:
J. C. Counts
by D. P. Holloway & Co.
Atty.

AM. PHOTO-LITHO. CO. N.Y. (OSBORNE'S PROCESS.)

United States Patent Office.

JOHN C. COUNTS, OF CROSS ROADS, OHIO.

Letters Patent No. 64,749, dated May 14, 1867.

FRUIT GATHERER.

The Schedule referred to in these Letters Patent and making part of the same.

TO ALL WHOM IT MAY CONCERN:

Be it known that I, JOHN C. COUNTS, of Cross Roads, in the county of Madison, and State of Ohio, have invented a new and useful improvement in Fruit-Pickers; and I do hereby declare that the following is a full, clear, and exact description of the same, reference being had to the annexed drawings, making part of this specification, in which—

The same letters are used in both figures in the indication of identical parts.

Figure 1:
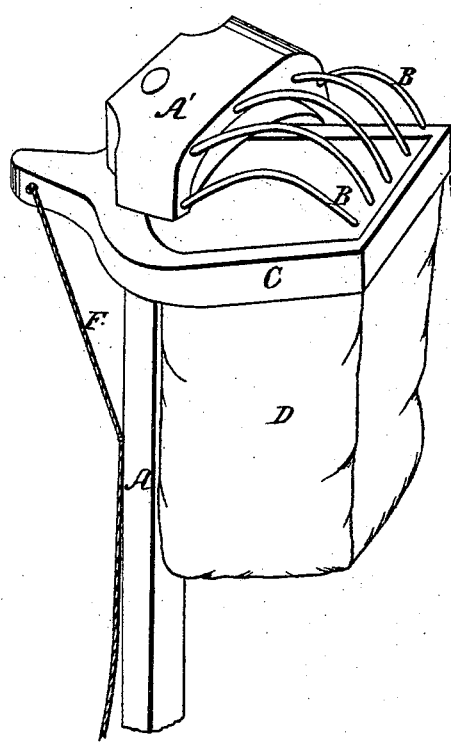
Figure 1 is a perspective view.
Figure 2:
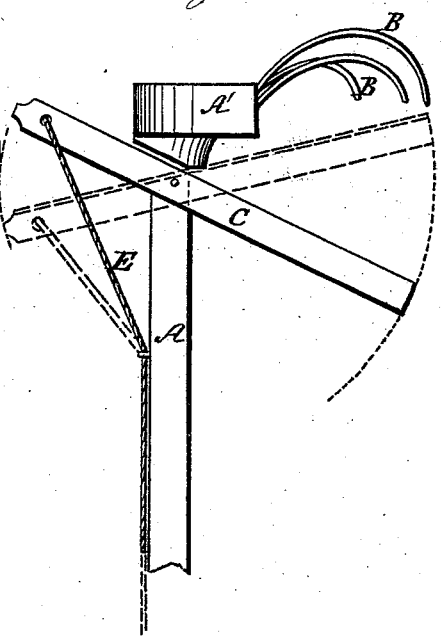
Figure 2 is a side elevation.

A is the handle of sufficient length to reach the fruit conveniently, and formed with a head, A', into which the curved teeth B are inserted. The bag-frame C is pivoted to the handle in any convenient manner, so as to oscillate freely, vertically, sufficiently to enable the fruit intended to be gathered to pass between it and the ends of the teeth B, when the apparatus is brought into use. The bag D is attached to this frame, descending along the handle, and is intended to receive the fruit when it has been pulled from the branch. This frame extends back behind the handle A, so as to form a lever to which the cord E is attached, which passes down and along the handle to the hand of the operator.

In operating with this fruit-picker its own gravity will depress the frame so that the fruit may pass below the teeth B, the stem passing between them. The cord E being now drawn down, the frame will rise, enclosing the fruit, and the latter being drawn by the teeth B will pluck the fruit from the bough. The fruit falls into the bag D, which receives it without injury to the fruit.

What I claim as my invention, and desire to secure by Letters Patent, is—

An apparatus for gathering fruit constructed with the parts A, B, C, D, and E respectively, constructed and arranged substantially as set forth.

In testimony whereof I have signed my name to this specification in the presence of two subscribing witnesses.

JOHN C. COUNTS.

Witnesses:
JOHN C. McCLOUD,
GEO. LINCOLN.